Aug. 11, 1959  G. BERGSON  2,898,800
GAS ANALYZING SYSTEM OF THE RADIANT ENERGY ABSORPTION TYPE
Filed July 23, 1954

INVENTOR.
GUSTAV BERGSON
BY *Eugene M. Whitacre*
ATTORNEY

United States Patent Office 2,898,800
Patented Aug. 11, 1959

2,898,800

GAS ANALYZING SYSTEM OF THE RADIANT ENERGY ABSORPTION TYPE

Gustav Bergson, Philadelphia, Pa.

Application July 23, 1954, Serial No. 445,232

6 Claims. (Cl. 88—14)

This invention relates to apparatus for the analysis of gas mixtures by radiant energy. More particularly, the invention relates to a system for analyzing gases or liquids by measuring the relative absorption of radiant energy by a gas component or a plurality of gas components present in a sample of gas mixture or liquid under test.

It has been long recognized that certain gases have the power of absorbing energy from certain wave lengths of radiant energy. By way of example, some gases such as $CO_2$, $H_2S$, $HCN$ and $H_2O$ exhibit spectra in the infra red region which are characterized by relatively intense absorption bands when infra red radiations are passed therethrough. Other gases such as acetone benzene, chlorine, ozone, etc., exhibit strong absorption spectra in the ultra violet region. In one known instrument the operation of which is based on this phenomenon, a source of radiant energy is provided, and a sample of gas containing the component to be detected or measured and having an absorption spectra in the band of wavelengths of the radiant energy is interposed in the path of the radiant energy. The sample of gas may be enclosed in or passed through an enclosure or absorption chamber suitable for containing the gas under test and having provisions for allowing the beam to pass therethrough. The beam is then directed toward a first detector in the form of a thermopile, bolometer, phototube or the like. A second beam emanating from the source is directed toward a second detector and may, if desired, be directed through a standard gas sample. By comparing the differential readings of the first and second detectors, the overall absorption of the test sample may be ascertained and thereby an indication of the quantity of the component under test present in the sample may be obtained.

It is often desirable to be able to detect the presence of more than one of the components of the gas mixture under test. This may be done sequentially with the system described above by taking advantage of the fact that although the different components of the gas mixture exhibit absorption spectra within a particular region, such as the ultra violet region, the maximum absorption for the different components is at different wavelengths within that region. Specifically, the instrument described above may be used to measure the separate components in two steps by selectively filtering the radiant energy passed through the gas so that only those wavelengths most affected by one of the components to be detected are passed to the detector. In other words, after measuring one component, the filtering means must be changed to measure another gaseous component, causing inconvenience of operation and problems with regard to cleaning, storage and handling of the filters.

It is accordingly a primary object of this invention to provide an improved gas analyzing system which overcomes the difficulties described and which is adapted to simultaneously detect and measure a plurality of components of a sample of gas under test.

It is another object of this invention to provide an improved gas analyzing apparatus having a simple and compact structure and which may be used to detect simultaneously one or more components of a gas under test.

In accordance with the invention, a sample of the gas to be tested is placed in or passed through an absorption chamber and radiant energy having wavelengths in that portion of the spectrum which the components of the gas to be detected are known to exhibit absorptive power are directed through the absorption chamber. If desired, a liquid containing the gas components to be detected may be passed through the absorption chamber, as referred to herein, a component of a gas mixture is meant to include a gas component dissolved in a liquid. The radiant energy is then directed successively to a plurality of different detectors.

In one embodiment of the invention the gas analyzing apparatus is provided with a plurality of photoelectric tubes having semi-transparent cathodes. The photoelectric tubes are positioned so that the beam of radiant energy passing from the absorption chamber successively impinges on, and is partially transmitted through the cathodes of each of the tubes. A suitable electrical measuring circuit or other indicating device is connected with each of the phototubes to provide a means for indicating the relative energization thereof by the beam of radiant energy thus giving an indication of certain components present in the gas sample.

The system is designed so that each of the plurality of successive photoelectric tubes is responsive to different wavelengths which correspond to those most absorbed by the different components of the gas to be detected. Accordingly, the cathodes of the photoelectric tubes may be made most sensitive at the wavelengths at which the component to be detected by that particular tube exhibits the greatest absorptive spectra. Alternatively, if it is desirable to use a plurality of similar photoelectric tubes in the system, filter elements may be interposed in the path of the beam between the different tubes so that only predetermined wavelengths of the radiant energy impinge on any given cathode. Hence, the energization of the different detectors is a function of the absorption of the radiant energy by different components of the gas under test.

The cathode of the photoelectric tubes need not be of the semi-transparent type. For example, a comb-like structure, or any structure for that matter, which has portions thereof removed to permit a portion of the beam of radiant energy to be intercepted and a portion to pass through, may be in connection with the gas analyzing system of the invention.

A standard or comparison photoelectric tube may be provided to receive the beam passing from the last of the aforesaid photoelectric tubes. At this point, the beam may be filtered so that only those wavelengths outside the range of all the wavelengths absorbed by the components of the gas energize the standard or comparison cell. The standard photoelectric tube measures and compensates in the indicating system for changes in lamp intensity, window clouding of the photoelectric tubes and the absorption chamber, etc., and may be connected as a standard of comparison for one or more of the other tubes in the system.

Accordingly, another object of this invention is to provide a gas analyzing system of the type described for detecting and measuring one or more components of a gas mixture in which a beam of radiant energy is passed successively through a gas mixture under test and then to different detectors, one of which is connected as a standard detector which is energized by the beam after filtering out the wavelengths of the radiations corresponding with the principal absorptive spectra of the various components of the gas under test and directing the resultant beam on the comparison cell.

A still further object of this invention is to provide a gas analyzing system of the type for detecting one or more components of a gas under test by passing a beam of radiant energy successively to different detector devices which are energized by different wavelengths of the radiant energy corresponding to those wavelengths absorbed by the different components under test.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
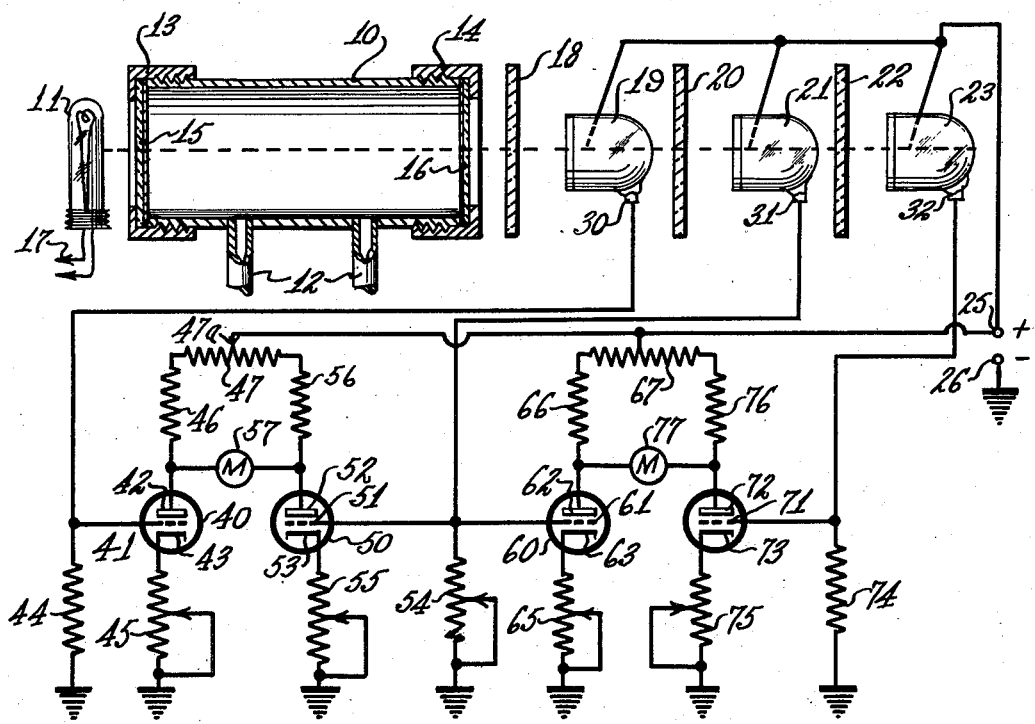
Figure 1 is a diagrammatic longitudinal sectional view of one form of a gas analyzing apparatus embodying the invention and showing a schematic circuit diagram of an electrical indicating system connected therewith.

Referring now to the drawings, and particularly to Figure 1, a sample of the gas to be tested is admitted into an absorption chamber 10 through a pair of inlet and outlet pipes 12. If desired, the gas under test may be continuously passed through the absorption chamber 10. The absorption chamber 10 shown in this embodiment of the invention has a cylindrical body portion with opposite ends thereof closed by the windows 15 and 16. The windows 15 and 16 are tightly sealed with appropriate gaskets to the cylindrical body portion by any suitable fastening device such as a pair of screw-on caps 13 and 14.

A source of radiations 11, which by way of example, may be a source of ultraviolet radiations such as a G4S11 lamp, which is connected with a pair of terminals 17 for supplying an energizing potential, is positioned adjacent to the window 15 for directing radiant energy into the absorption chamber 10. The windows 15 and 16 are made of a material such as quartz or other material which is permeable by the radiant energy from the source 11.

Figure 2:
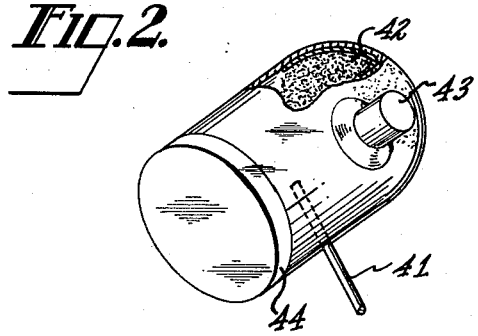
Figure 2 is a perspective view of a photoelectric tube having a semi-transparent cathode which may be used with the gas analyzing system shown in Figure 1.
Figure 3B:
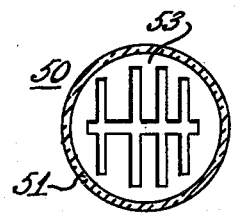
Figures 3a and 3b are side and front views respectively, of a photoelectric tube constructed with a modified cathode and which may also be used in connection with gas analyzing systems shown in Figure 1.
Figure 3A:
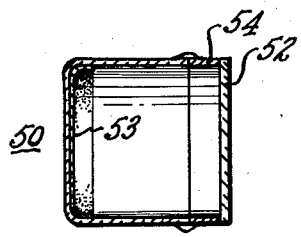

The beam emerging from the window 16 is directed successively through a series of photoelectric tubes 19, 21 and 23, which have semi-transparent cathodes or cathodes which allow a portion of the beam to pass through such as are shown in Figures 2 and 3. A first optical filter 18 is interposed between the absorption chamber 10 and the photoelectric tube 19. A second optical filter element 20 is interposed between the first photoelectric tube 19 and the second photoelectric tube 21, and a third optical filter 22 is positioned between the second photoelectric tube 21 and the third photoelectric tube 23.

In describing the operation of the gas analyzing system of the invention, it will be assumed that the gas under test contains two components which it is desired to measure. One of the components will be assumed, by way of example, to have a strong absorptive spectra at wavelengths around 185 millimicrons, and the other to have a strong absorptive spectra around 254 millimicrons. The beam emanating from the source 11 has a relatively wide band of ultraviolet wavelengths including the wavelengths at 185 millimicrons and 254 millimicrons. The beam is passed through the absorption chamber 10 which contains the gas sample having the two components mentioned above, and wavelengths at 254 and 185 millimicrons are at least partially absorbed by the components. The optical filter 18 attenuates wavelengths below 185 millimicrons so that any minor absorptive spectras of the components below 185 millimicrons will not affect the energization of the cathodes of the photoelectric tubes in the system.

The filter 18 is optional equipment and is not necessary to the effective operation of the gas analyzing system.

It may be assumed that the photoelectric tubes 19, 21 and 23 are of similar construction, and are responsive generally to all the wavelengths of interest in the ultra violet range. The cathode of the photoelectric tube 19 is therefore responsive to the wavelengths at both 185 and 254 millimicrons and will give a relative indication of the radiant energy at 185 and 254 millimicrons which is incident thereon as well as incidental changes in absorption. The filter 20 attenuates the wavelengths of the radiant energy of 185 millimicrons or less so that the second photoelectric tube 21 will only be affected by the relative absorption at 254 millimicrons as well as incidental changes in absorption by the windows in the absorption chamber 10, the filters 18 and 20, and the windows of the photoelectric tubes. A third photoelectric tube 23 which is a comparison or standard cell, is connected in circuit with the second photoelectric tube to provide a differential indication of the relative absorption of the particular component at 254 millimicrons. The filter 22 which is located between the photoelectric tubes 21 and 23, attenuates the wavelengths equal or less than 254 millimicrons so that the response of the cathode of the third photoelectric tube is essentially outside the range of any of the wavelengths absorbed by the components of the gas under test, and serves as a standard comparison photocell whose current measures the changes in lamp intensity, window absorption of the absorption cell and the phototubes and filters and the like.

It is understood that the system could be continued upward in wavelengths for several cells so that several components contained in the gas mixture under test could be detected and measure. It is recognized that the filters could be incorporated as the front surface of the phototubes thus eliminating extra parts, and alternatively, if desired, phototubes having cathodes which respond only at certain wavelengths could be used as will be hereinafter described.

The photoelectric tubes 19, 21 and 23 are each provided with an anode element and a cathode element. The anodes of the photoelectric tubes 19, 21 and 23 are connected with a terminal 25 which supplies a polarizing potential from a power source, not shown. A second power supply terminal 26, is connected with a point of fixed reference potential or ground. The cathodes 30, 31 and 32 of the photoelectric tubes 19, 21 and 23 respectively, are connected with the electrical indicating circuit. The cathode 30 is connected with a control electrode 41 of an amplifier tube 40 which also has an anode 42 and a cathode 43. A resistor 44 is connected between the control electrode 41 and ground to provide a direct current grid return circuit for the tube 40, and also to complete the direct current path of the photoelectric tube 19. A variable cathode bias resistor 45 is connected between the cathode 43 and ground to provide an operating bias potential for the amplifier tube 40. The anode 42 is connected through the resistor 46 and a part of the variable resistor 47 to the terminal 25, which supplies the polarizing potential for the amplifier.

The cathode 31 of the photoelectric tube 21 is connected to the grids 51 and 61 of the amplifier tubes 50 and 60 respectively. A resistor 54 provides a common grid return for the amplifier tubes 50 and 60, and also serves to complete the direct current path of the photoelectric tube 21 to ground. The amplifier tube 50 includes together with the grid 51, an anode 52 and a cathode 53. The cathode 53 is connected through a variable cathode bias resistor 54 to ground while the anode is connected through a resistor 56 and part of the variable resistor 47 to the terminal 25 which supplies the polarizing potential for the tube. A meter is connected between the anodes 42 and 52 to indicate the differential anode potential of the tubes 40 and 50 which is a function of the absorption of the wavelengths at 185 millimicrons as will hereinafter be explained.

As mentioned above, the cathode 31 of the photoelectric tube 21 is connected with the control electrode 61 of the amplifier tube 60. The amplifier tube 60 also has an anode 62 and a cathode 63. A variable cathode bias resistor 65 is connected between the cathode 63 and ground. The anode 62 is connected through an anode load resistor 66 and a portion of a variable resistor 67 to the terminal 25 which supplies the polarizing potential for the amplifier tubes.

The cathode 32 of the photoelectric tube 23 is connected with a control electrode 71 of the amplifier tube 70. A resistor 74 provides a grid return for the tube 70 and also serves to complete the direct current path of the photoelectric tube 23 to ground. The tube 70 has a cathode 73 which is connected to ground through a variable bias resistor 75 and also has an anode 72 which is connected through an anode loading resistor 76 and a portion of the variable resistor 67 to the polarizing potential terminal 25. A meter 57 is connected between the anode 62 and 72 to provide means for indicating the differential anode potential which is a function of the absorption of the wavelengths at 254 millimicrons in the present example.

To adjust the system for operation, the tubes 40 and 50 should have equal anode potentials when none of the components of the gas to be detected are present, or in other words, when none of the radiant energy is absorbed. This may be done by evacuating the absorption chamber 10 or supplying a reference gas therein and adjusting the tap 47a of the resisttor 47 to increase the load resistance in the anode circuit of one of the tubes and reduce it in the anode circuit of the other tube. A sample of gas containing a component which absorbs ultra violet energy at 254 millimicrons and no components which absorb 185 millimicrons is then admitted into the absorption chamber and the cathode resistors 45 and 55 are adjusted so that the tubes 40 and 50 will operate on a predetermined portion of their operational curves whereby they will have equal response at the anodes thereof.

If a gas is introduced into the absorption chamber 10 which contains components that absorb wavelengths of 185 and 254 millimicrons respectively, the energization of the photoelectric tube 19 will be changed as a function of the absorption of the radiant energy by both components in addition to the changes in absorption of radiant energy due to the filters, phototube windows, absorption chamber windows etc. Since the filter 20 absorbs wavelengths at 185 millimicrons, the photoelectric tube 21 is responsive to changes in absorption of the radiant energy by the component which absorbs 254 millimicrons in addition to the other changes in absorption due to the filters, phototube windows, and absorption chamber windows etc.

Thus the signals fed to the control electrodes 41 and 51 of the tubes 40 and 50 by the photoelectric tubes 19 and 21 are equal except to the extent of the change in energization of the phototube 19 due to absorption of the 185 millimicrons wavelength. Accordingly, this differential input voltage on the grids 41 and 51 is amplified and appears between the anodes 42 and 52 of the tubes 40 and 50. The potential difference between the anodes 42 and 52 is a function of the quantity of the gas component present which absorbs wavelengths at 185 millimicrons, and is indicated on the meter 57.

In like manner the reading on the meter 77 gives an indication of the relative quantity of the component of gas present in the sample which absorbs 254 millimicrons. The photoelectric tube 21 is responsive to changes in absorption due to the presence of a component which absorbs 254 millimicrons in addition to the other miscelleaneous absorptions. Since the filter 22 stops the 254 millimicrons, the energization of the phototube 23 is only due to the miscellaneous changes in absorption of the radiant energy. The outputs of the photoelectric tubes 21 and 23 are fed to the tubes 60 and 70 respectively, the only difference between the two being due to the absorption of the components of the gas at 254 millimicrons. The differential input voltage is amplified and appears between the anodes 62 and 72 which difference in potential is indicated by the meter 77. The readings of meter 77 is thus a function of the absorption of radiant energy at 254 millimicrons and gives a relative indication of the quantity of a component of gas present in the absorption chamber which has an absorption spectra at 254 millimicrons.

The particular measuring circuit shown and described above is only one type of indicating circuit which might be used with the analyzing equipment of the invention and the invention should not be limited to the measuring system shown.

In another embodiment of the invention, phototubes may be used which have cathodes that are sensitive to different predetermined wavelengths. For example, certain metals are responsive to different wavelengths hence, by providing the cathodes of the photoelectric tubes with the proper materials, the system described above can function without the use of filter elements.

The wavelengths at which a particular material becomes sensitive is dependent on its work function. "Photoelectric Phenomena" by Hughes and Du Bridge, first edition, 1932, presents a comprehensive text on the subject as well as a table of materials and the wavelengths at which they become sensitive, covers the subject. For instance, platinum, after extended outgassing, is sensitive to wavelengths of about 196 millimicrons and shorter. Tungsten, on the other hand, is responsive to wavelengths of about 260 millimicrons and shorter. To incorporate photoelectric tubes of this type into the system shown in Figure 1, the tube 19 should have a cathode of tungsten thus being responsive to changes in the absorption at both 185 and 254 millimicrons, while the photoelectric tube 21 would have a cathode of platinum and would be responsive to only 185 millimicrons. The standard cell 23 would preferably be fabricated of a material responsive to a relatively wider range of ultra violet wavelengths, and would be provided with a filter to remove the 185 and 254 millimicron components. The phototubes could be connected in the electrical measuring circuit in the same manner as described above in connection with Figure 1. In this particular case, however, the meter 57 indicates the presence of a component absorbing 254 millimicrons while the meter 77 indicates the presence of a component absorbing 185 millimicrons.

Referring now to Figure 2, there is shown a photoelectric tube having a semi-transparent cathode which may be used with the gas analyzing system of the invention. The photoelectric tube 40 is provided with a rod-shaped anode 41 and a semi-transparent cathode 42. A terminal connector 43 is provided in the tube 40 to provide a means for connection to the cathode surface 42. The cathode 42 is formed by evaporating an appropriate metal on the surface of the tube 40. The evaporation may be accomplished by placing the material to be evaporated on a filament structure. The filament structure is placed in the envelope which is evacuated to prevent contamination by air, and is then heated to boil the cathode material off. The extent to which the cathode material is evaporated on the surface of the envelope depends on the degree of transparency desired. The envelope for the photoelectric tube 40 is sealed by a front window 44 which may be made of quartz or some other material which is easily permeable by the radiations to be detected.

When the radiant energy from the source 11 is directed on the cathode 42, some of the energy passes on through to the next tube while at the same time the beam energizes the cathode 42, and causes electrons to be released therefrom. These electrons are then attracted to the anode 41 which is at a higher potential than the cathode.

Referring now to Figure 3, another embodiment of a photoelectric tube is shown which may be used with the gas analyzing system of the invention. The photoelectric tube 50 is provided with an envelope 51 having a front window 52 which seals the envelope 51. An annular anode structure 54 extends around the interior of the container 50 and a cathode 53 is provided in the rear of the envelope 51. The cathode 53 has comb-like cut-out areas to permit a portion of the radiation to pass therethrough. It is obvious that other shapes than the comb-like shape shown may be used for the cathode of this photoelectric. For example, the cathode may be in the form of a spiral, or joined circles, the main point being to have means for collecting of the radiations and passing part through the cell.

If the cathode is of a material whereby it can be fabricated in the presence of air without contamination, it may be formed by masking the rear surface of the container 50 and evaporating a suitable metal on the surface. In other cases, the cathode may be cut or stamped from a sheet of the material sensitive to the radiations and cemented in the rear of the container 50. If the cathode cannot be exposed to the atmosphere and must be obtained in vacuum after the air is evacuated from the enclosure 50, a low melting wax having a low vapor pressure may be used for masking the cathode and after the envelope is evacuated, the masking may be melted away by application of heat to the tube. If desired, the wax may be made to drain into a tube which is then sealed off from the main envelope.

In accordance with the invention, a gas analyzing system has been described having simple and compact structure for enabling the simultaneous detection and measuring of one or more components of a gas sample under test by directing a beam of radiant energy successively to different ones of a plurality of detectors.

What is claimed is:

1. A gas analyzer of the type which measures the absorption of radiant energy by a component of the gas under test comprising in combination, a source of radiant energy including wavelengths absorbed by said component, an absorption chamber for containing a sample of gas to be analyzed, a first, second and third detection means, said absorption chamber and said first, second and third detection means being positioned relative to said source such that radiant energy emanating from said source passes successively through said absorption chamber and said first first and second detection means to said third detection means, a filter element interposed between said absorption chamber and said first detector for passing wavelengths from said source longer than a predetermined wavelength, a second filter interposed between said first and second detectors for passing wavelengths longer than a second predetermined wavelength, and indicating means connected to said first, second and third detection means.

2. A gas analyzing system for detecting one or more components of a gas mixture comprising in combination, a source of radiant energy including wavelengths absorbed by said components, an absorption chamber for containing a sample of a gas mixture to be analyzed, a first, second and third detection means, said absorption chamber and said first, second and third detection means being positioned relative to said source such that radiant energy emanating from said source passes successively through said absorption chamber and said first and second detection means to said third detection means, first filter means between said first detector and said second detector for attenuating wavelengths of said radiant energy absorbed by the component of the gas mixture detected by the first detector, second filter means interposed between said second and said third detectors for attenuating wave lengths of said radiant energy absorbed by the components of the gas mixture detected by the second detector, and differential indicating means connected with said first, second and third detectors for indicating the presence of the respective components of the gas under test.

3. In a gas analyzing system of the type which measures the absorption of radiant energy by a gas under test, the combination comprising means providing a source of radiant energy having wavelengths in that portion of the spectrum in which the gas to be detected exhibits absorptive power, an absorption chamber for containing a sample of the gas mixture to be analyzed, a first detection means responsive to radiant energy having wavelengths in the spectrum in which said gas exhibits absorptive power, a second detection means responsive to radiant energy having wavelengths outside a principal absorption band of said gas, said absorption chamber and said first and second detection means being positioned relative to said source so that radiant energy emanating from said source passes successively through said absorption chamber and said first detection means to said second detection means, and differential indicating means connected with said first and second detection means for indicating the relative absorption of said radiant energy by said gas under test.

4. In a gas analyzing system of the type which measures the absorption of radiant energy by a gas under test, the combination comprising means providing a source of radiant energy having wavelengths in that portion of the spectrum in which the gas to be detected exhibits absorptive power, an absorption chamber for containing a sample of the gas mixture to be analyzed, a first detection means including a first photoelectric tube responsive to radiant energy having wavelengths in the spectrum in which said gas exhibits absorptive power, a second detection means including a second photoelectric tube responsive to radiant energy having wavelengths substantially only outside the principal absorption band of said gas, said absorption chamber and said first, and second detection means being positioned relative to said source so that radiant energy passes in a single path from said source successively through said absorption chamber, said first detection means including said first photoelectric tube, and said second detection means including said second photoelectric tube, and indicator means including an electric circuit connected to said first and second photoelectric tubes and responsive to the differential energization of said tubes for indicating the relative amounts of absorption of said radiant energy by said gas under test.

5. A gas analyzing system for detecting at least two components of a gas mixture comprising in combination, means providing a source of radiant energy having wavelengths in that portion of the spectrum which first and second components of the gas to be detected exhibit absorptive power, an absorption chamber for containing a sample of the gas mixture to be analyzed, a first detection means responsive to radiant energy having wavelengths at which each of said first and second components exhibit absorptive power, a second detection means responsive to radiant energy having wavelengths at which only the first of said components exhibit absorptive power, differential indicating means adapted to be connected with said first and second detection means for indicating the presence of the second of said components of the gas under test, a third detection means responsive to radiant energy from said source having wavelengths outside the principal absorption band of said first and second components, differential indicating means adapted to be connected with said second and third detectors for indicating the presence of the first of said components of the gas under test, said absorption chamber and said first, second and third detection means being positioned relative to said source so that radiant energy emanating from said source passes successively through said absorption chamber and said first and second detection means to said third detection means.

6. A gas analyzing system for detecting at least two components of a gas mixture comprising in combination, means providing a source of radiant energy having wavelengths in that portion of the spectrum which first and second components of the gas to be detected exhibit absorptive power, an absorption chamber for containing a sample of the gas mixture to be analyzed, a first, second and third photoelectric tube detectors each responsive to radiant energy having wavelengths at which each of said first and second components exhibit absorptive power, said first and second photoelectric tubes having axially aligned radiation entrance and exit windows, said absorption chamber and said first, second and third photoelectric tubes being positioned relative to said source such that radiant energy emanating from said source passes successively through said absorption chamber and first and second photoelectric tubes to said third photoelectric tube, first filter means between said first photoelectric tube and said second photoelectric tube for attenuating wavelengths of said radiant energy in which only the first of said components exhibit absorptive power, second filter means interposed between said second and third photoelectric tubes for attenuating wavelength of said radiant energy in which both of said first and second components exhibit absorptive power, first indicator means connected to said first and second photoelectric tubes for indicating the differential output from said tubes which is representative of relative amount of said first component of said gas mixture, and second indicator means connected to said second and third photoelectric tubes for indicating the differential output from said last named tubes which is representative of the relative amount of said second component of said gas mixture.

References Cited in the file of this patent

UNITED STATES PATENTS

| | | |
|---|---|---|
| 2,431,019 | Barnes | Nov. 18, 1947 |
| 2,643,343 | Rainwater | June 23, 1953 |
| 2,654,845 | Presenz | Oct. 6, 1953 |
| 2,761,067 | Troy | Aug. 28, 1956 |

FOREIGN PATENTS

| | | |
|---|---|---|
| 645,576 | Great Britain | Nov. 1, 1950 |
| 698,023 | Great Britain | Oct. 7, 1953 |